United States Patent [19]

Ukai et al.

[11] 4,325,296
[45] Apr. 20, 1982

[54] APPARATUS FOR ADJUSTING INTERNAL PRESSURE OF ASEPTIC STORAGE TANK

[75] Inventors: Nobuo Ukai, Machida; Akira Funado, Funabashi; Tethuya Yokota, Mathudo, all of Japan

[73] Assignee: Kagome Co., Ltd., Aichi, Japan

[21] Appl. No.: 73,272

[22] Filed: Sep. 7, 1979

[30] Foreign Application Priority Data

Sep. 28, 1978 [JP] Japan .................................. 53-118624

[51] Int. Cl.³ ............................................. A23B 7/00
[52] U.S. Cl. ......................................... 99/468; 99/471;
99/474; 99/483; 99/516; 422/28; 426/418
[58] Field of Search ................. 99/471, 468, 473, 474,
99/483, 484, 516, 536, 467; 426/615, 418, 521;
422/28

[56] References Cited

U.S. PATENT DOCUMENTS 3,873,753  3/1975  Nelson et al. ......................... 99/483

Primary Examiner—Philip R. Coe
Assistant Examiner—Timothy F. Simone
Attorney, Agent, or Firm—Robert E. Burns; Emmanuel J. Lobato; Bruce L. Adams

[57] ABSTRACT

A method and apparatus for supplying and maintaining an aseptic gas atmosphere in a storage tank for spoilable contents such as foodstuffs and the like. The aseptic gas is supplied from a container under pressure and is maintained at the desired pressure in the storage tank by pressure-reducing valves in a supply line or conduit having a microbiological filter and pressure-maintaining valve that functions in place of a relief valve in the supply line. It responds to excess pressure in the storage tank and relieves the excess pressure through the same supply line through which gas is supplied without need of a relief valve on the storage tank.

2 Claims, 4 Drawing Figures

APPARATUS FOR ADJUSTING INTERNAL PRESSURE OF ASEPTIC STORAGE TANK

BACKGROUND OF THE INVENTION

The present invention relates generally to storage of foodstuffs and more particularly to a system or apparatus for supplying, adjusting and maintaining an aseptic atmosphere and pressure in a storage tank with a foodstuff as contents therein.

In the field of food processing, in which agricultural products are process into foods, the products produced on a farm are not immediately processed into their final form of processed foods since they have season-dependent characteristics and are harvested in large quantities at a time. The agricultural products are partially processed and are stored in storage tanks or containers in the form of half-processed products or primarily-processed products and are then processed into final food products as they are withdrawn from the storage container.

An example is tomatoes which have seasonal characteristics and are harvested in large quantities at a time and are processed into final food products such as tomato sauce, tomato ketchup or the like, before final processing they are temporarily stored in the form of a puree or paste, i.e. a primarily-processed product. These primarily-processed food products are then processed into final food products, such as tomato, sauce, tomato ketchup or the like as the primary processed product is withdrawn from the temporary storage container.

A most important thing in the series of steps of production of processed foods is to store the primarily-processed product in a perfectly sterilized state. Storing primarily-processed food products in a large storage tank is the most effective and most used method at present. However, when the primarily-processed food products are stored in a large storage tank, the temperature thereof must be kept as low as possible taking into account the possibility of deterioration and viscosity resistance thereof. In addition, much attention must be paid to the prevention of microbiological contamination of these primarily-processed food products. The contamination of supply and discharge pipes connected to a large storage tank storing the primarily-processed food products, contamination of a disc for restricting the supply and discharge flows of the primarily-processed product, contamination of the tank itself and its attachments or accessories, and the entry or invasion of contaminating microorganisms, must be strictly prohibited, even if such contamination is extremely small.

Various methods of and apparatus for storing primarily-processed food products in an aseptic manner have been disclosed in, for example, U.S. Pat. Nos. 3,871,824, 3,918,678, 3,918,942, 3,951,184 and 3,998,589 granted to Rechtsteiner.

For safety storing primarily-processed food products in an aseptic manner in an aseptic storage tank, it is necessary to maintain a positive pressure of aseptic gas in the storage tank. At the same time, it is necessary to provide an anti-explosion safety device to avoid an explosion resulting from an extraordinarily high internal pressure which may result from accidental rot of the primarily-processed food product in the tank.

According to the prior art, the aseptic gas is introduced into the tank through a microbiological filter attached to the tank, so as to maintain a positive pressure in the tank. A safety or relief valve for anti-explosion purposes is attached to the tank separately from the filter.

Taking into account that even slightly microbiological contamination can finally grow to deteriorate the whole of the contents of a storage system the number of parts, which may constitute causes of contamination, must be reduced as great as extent as possible. The known arrangements in which a microbiological filter and a safety valve are installed separately in the system increases the chances of contamination.

Particularly, specific attention must be paid in the known systems to the sterilization and cleaning of the safety valve. The parts around the safety valve directly attached to the tank require a supply of sterilizer and cleaning agent.

It is of great importance to ensure microbiological cleanliness, in order to store primarily-processed products for a long period of time in an aseptic state.

SUMMARY OF THE INVENTION

The present invention relates to an apparatus for adjusting the internal pressure of an aseptic storage tank, in order to enhance aseptic operation and maintenance of aseptic conditions of the aseptic storage tank.

It is an object of the present invention to eliminate the inconvenience caused by the aforementioned direct attaching of a safety valve to the storage tank, by using a system in which pressure-adjusting means are attached to the tank indirectly through a microbiological filter which is directly attached to the tank, and, at the same time, to make it possible to observe and control the pressure and aseptic conditions in the storage tank from externally of the latter.

It is another object of the invention to improve the preservation of the quality of the primarily-processed food product, by introducing an inert gas into the tank through a pressure-adjusting system and the microbiological filter.

It is still another object of the invention to provide an apparatus for adjusting the internal pressure of the aseptic storage tank which can fulfill the above-stated two objects of the invention.

Provision is made by the invention for a system externally of a foodstuff storage tank for connecting a container of an inert aseptic gas for supply of the gas to the storage tank through a supply line having adjustable pressure-reducing valves. A one-way valve in the supply line allows flow of gas only toward the storge tank through a microbiological filter and an aseptic valve connected in the supply line. Pressure in the tank is maintained at the level set by responding to pressure rises in the supply line due to pressure rises in the storage tank and relieving the pressing upstream of the one-way valve by a pressure-maintaining valve.

BRIEF DESCRIPTION OF THE DRAWINGS

These and other objects, as well as how these objects are achieved will become clear from the following description of the preferred embodiment taken in conjunction with the accompanying drawings in which.

DESCRIPTION OF THE PREFERRED EMBODIMENT

Figure 1:
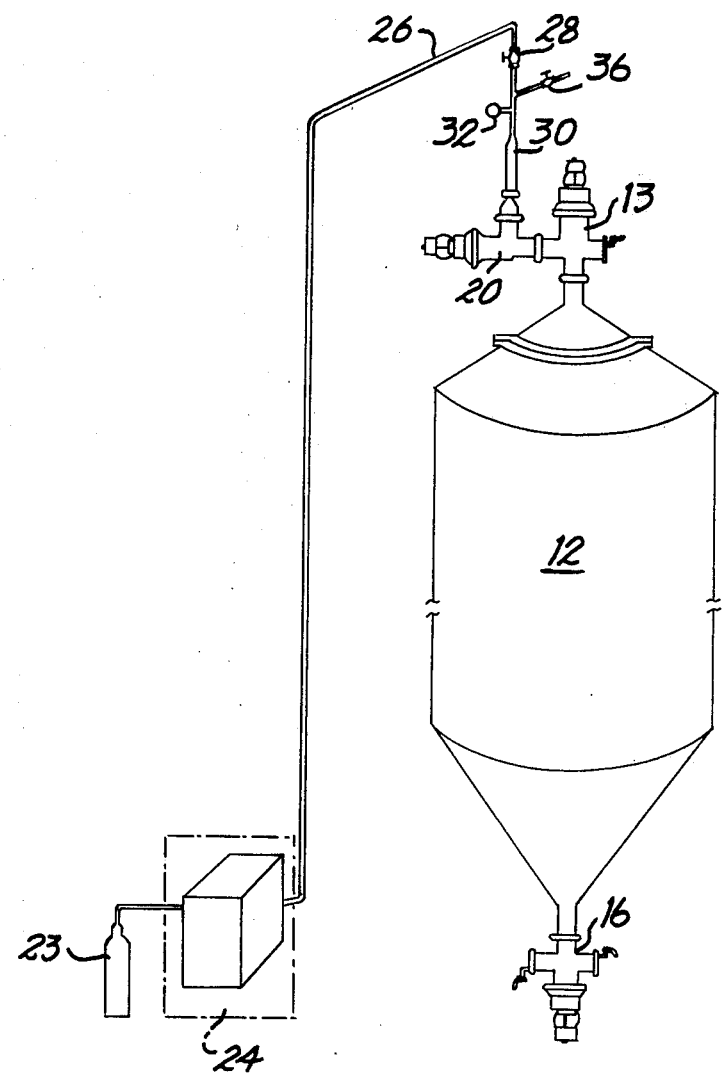
FIG. 1 is a perspective diagrammatic view of an aseptic storage tank provided with a system according to the invention.
Figure 2:
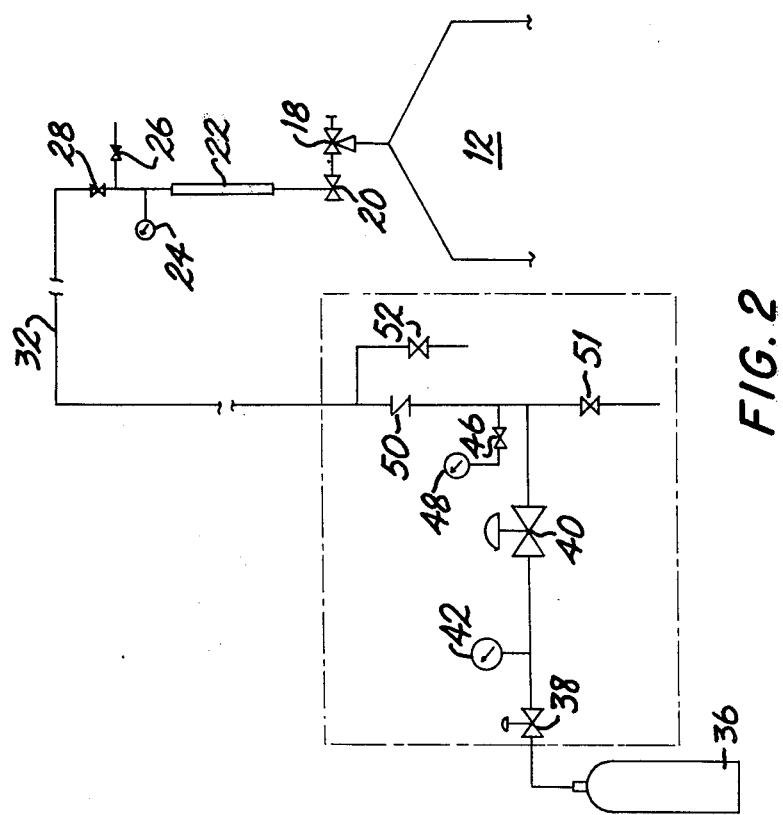
FIG. 2 is a diagram of a pressure-adjusting and maintaining system according to the invention.
Figure 3:
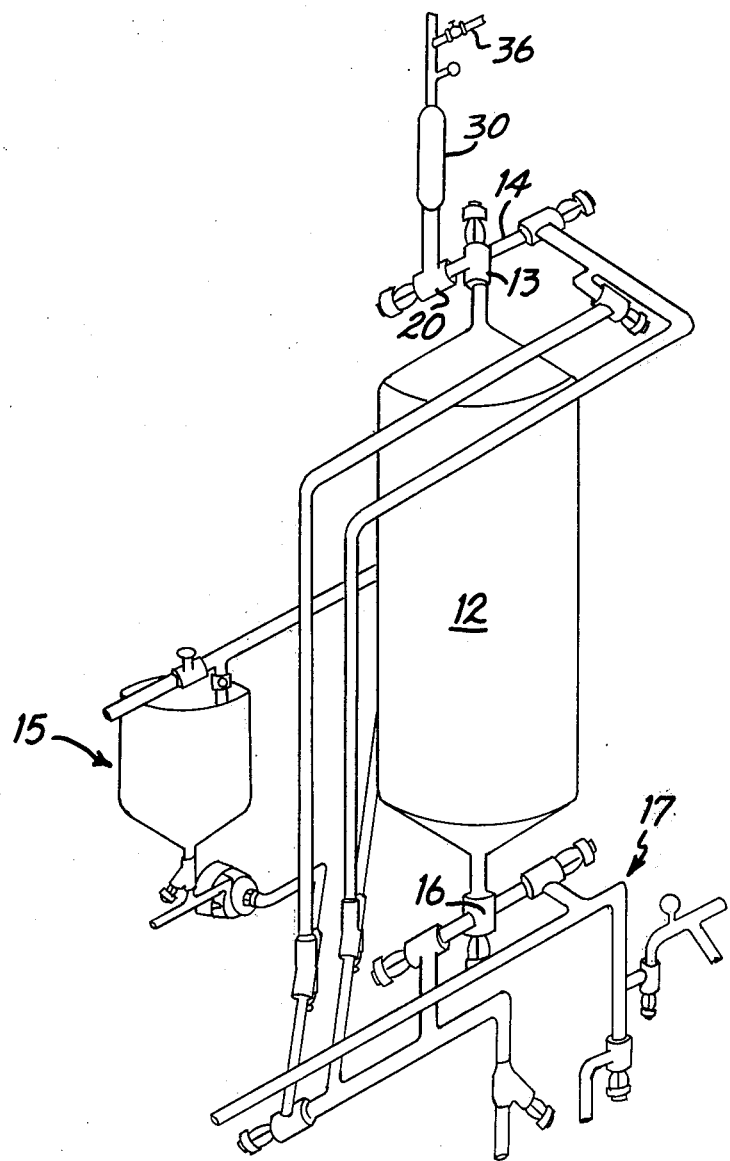
FIG. 3 is a perspective view of the storage tank in FIG. 1 illustrated in its working environment.
Figure 4:
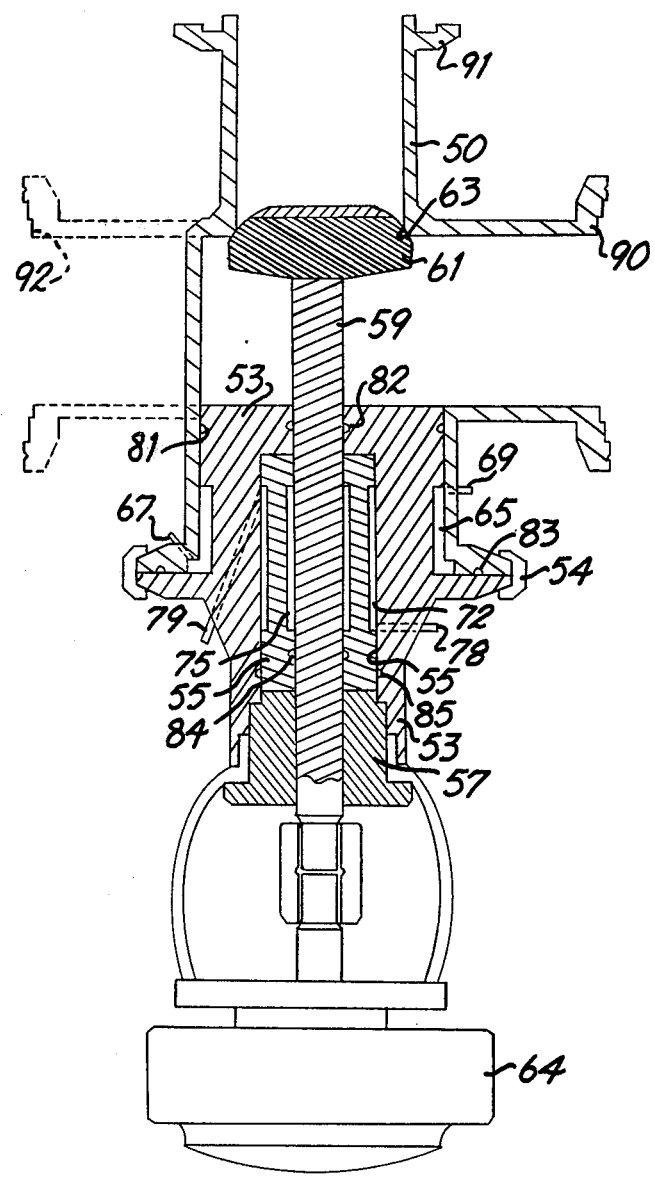
FIG. 4 is a sectional view of an aseptic valve for carrying out the invention.

According to the invention a foodstuff storage tank 12 is connected to an aseptic valve 13 having a connection to a supply line for supply of a primarily-processed food product into the storage tank 12, from a source such as arrangement 15, for temporary storage therein. The tank is provided with an outlet aseptic valve 16 and discharge connections 17 for delivery of the primarily-processed food for final processing. The source of processed food product and final processing arrangements have nothing to do with the system and method according to the invention.

A second aseptic valve 20 is connected to the inlet aseptic valve 13 for supply of an inert aseptic gas under pressure into the storage tank through the inlet aseptic valve 13 which is common both to the inlet of foodstuffs into the storage tank or the inert aseptic gas.

Provision is made, according to the invention, to supply an atmosphere of an inert aseptic gas into the storage tank 12 and maintain the tank at a selected internal pressure. A source of inert septic gas under pressure such as a gas cylinder 23 is provided. Control of the supply of gas is effected through an apparatus or system 24 hereinafter described. The inert aseptic gas, for example hydrogen, is supplied through a single line or path 26 in which is connected a shut-off valve 28 and a microbiological filter 30 connected to the inert gas septic valve 20.

A pressure gauge 32 is provided on the gas supply line to indicate the pressure in the supply line 26 and in the storage tank 12. The pressure in the tank as to the gas atmosphere therein is maintained constant as later described; however, pressure in the tank can rise due to break-down of the contents due to contamination.

Provision is made in the system for sterilizing the aseptic system through a steam line connection 36 connected to the inert gas supply line as shown.

According to the invention the system or apparatus 24 provided for maintaining accurate control of the gas atmosphere provides for adjustable control of the internal pressure of the tank. An adjustable first pressure-reducing valve 38 is connected to the gas cylinder 23 for making a coarse pressure reduction of gas supplied to the supply line 26 from the gas cylinder. An adjustable second pressure-reducing valve 40 is provided downstream of the first pressure-reducing valve for making a fine adjustment of the gas pressure to the storage tank. A pressure gauge 42 is provided between the two pressure-reducing valves continuously indicating the pressure. A valve 46 controls the application of gas pressure to a second pressure gauge 48 indicating the gas pressure setting in the supply line 26.

The gas system 24 is isolated from back pressure in the supply line section between the gas supply system and the storage tank by a one-way or check valve 50. The gas supply system 24 can be bled of or drained through a drain valve 51. The check valve 50 allows gas flow only in the direction of the storage tank. In isolating the storage tank internal pressure from the gas supply system by the check valve the invention makes it possible to maintain a controlled internal pressure in the storage tank. Moreover, provision can thus be made for responding to excess pressure in the storage tank and relieving it without need of a relief valve directly mounted on the storage tank. It is thus also possible for the invention to provide a method of adjusting the internal pressure of a storage tank for storing foodstuff material in an aseptic manner.

In order to maintain a selected maximum internal pressure in the storage tank a pressure-maintaining valve 52 is provided upstream of the check valve 50 relative to the gas flow. This valve responds to pressure in the storage tank and maintains it. In the event of a build-up of pressure in the storage tank the pressure-maintaining valve 52 functions in relieving of excess pressure.

The elimination of a relief valve on the storage tank eliminates possibilities of contamination usually present in storage tanks that have relief valves directly mounted thereon. Moreover, cleaning fluids therefor are also eliminated.

When it is desired to maintain the internal pressure of the aseptic storage tank 12 at a positive pressure of, for example 0.45 kg./cm.$^2$ to 0.50 kg./cm.$^2$, the pressure maintaining valve 52 is adjusted to 0.50 kg./cm.$^2$, while the finely adjustable reducing valve 40 is adjusted to reduce the pressure down to 0.45 kg./cm.$^2$.

As a result, the aseptic inert gas is supplied into the aseptic storage tank, through the finely adjustable reducing valve 40, check valve 50 and the microbiological filter 30, when the internal pressure in the aseptic storage tank comes down below 0.45 kg./cm.$^2$.

When the internal pressure is maintained between 0.45 kg./cm.$^2$ and 0.50 kg./cm.$^2$, the check valve and the pressure preserving valve 52 are not operated so that the internal pressure is maintained.

On the contrary, if the internal pressure in the storage tank 12 has become higher than 0.50 kg./cm.$^2$, the internal pressure is relieved through the microbiological filter and the pressure maintaining valve.

It is therefore possible to maintain the atmosphere of the aseptic gas of the desired positive pressure in the aseptic storage tank, through suitably adjusting the valves from the outside of the tank.

The aseptic valves according to the invention comprise a valve body 50 to which is secured a bonnet 53 by a connector or clamp 54 and have a recess 55 within which is disposed a bushing 56 snugly fitting therein. The bushing is made of a molded fluoric resin, for example; and held by a plug 57 so that the valve can be readily disassembled for cleaning. A valve stem 59 extends axially through the bushing and bonnet and is provided with a valve element or disc 61 which seats on a seat 63 and is operable by a manual actuator 64.

The aseptic valve is maintained sterilized by a constant supply of a sterilizing liquid flowing through a first cavity or chamber 65 which is formed by an annular recess in the bonnet and the valve body. The sterilizing liquid enters at an inlet 67 and is discharged through an outlet 69.

The bushing has an annular circumferential recess that forms with the bushing recess 55 a second sterilization chamber 72 and a bore with a major diameter that forms with the valve stem 59 a third sterilization chamber 75 in communication with the second chamber through a passageway, not shown, in the bushing. A sterilizing liquid is continuously replaced through an inlet 78 and flows out an outlet 79, so that the valve stem is constantly bathed in a sterilizing liquid to prevent micro-organisms from entering the storage tank through the valve stem and other parts of the valve.

In order to maintain a fluidtight seal the valve is provided with a plurality of O-ring seals 81,82,83,84,85 disposed as shown so that the valve is completely sealed. The valve connections are constructed as shown at 90,91 and in broken lines 92 depending on where and how the aseptic valve is to be connected.

Those skilled in the art will understand that the system and aseptic valve construction described reduce possibilities of bacterial or microbiological contamination and maintain the storage tank at a safe internal pressure. The valve parts in contact with the sterilization fluid are preferably constructed of anticorrosive materials.

It is possible to maintain an aseptic gas atmosphere of a positive pressure in the aseptic storage tank and to protect the tank against explosion, as well as to observe and control the condition in the aseptic tank from the outside of the latter, by making use of the pressure adjusting means connected to the aseptic storage tank through the microbiological filter.

What we claim is:

1. Apparatus for maintaining an aseptic gaseous atmosphere in a storage tank for spoilable foodstuffs and the like comprising, a system connectable externally of said storage tank and having means for providing a gas flow path for connecting a container of an inert aseptic gas under pressure for supply of said gas to said storage tank to supply an atmosphere of said gas in said storage tank comprising adjustable pressure-reducing valve means connectable in said same flow path to said gas container for receiving said gas and reducing it to a given pressure level to be maintained in the storage tank, a one-way valve connected in the system in said same flow path downstream of said pressure-reducing valve means to allow flow of said gas along a flow path in a direction toward said storage tank only, means in said system for connecting the one-way valve in said flow path to said tank, a single pressure-maintaining valve connected in said system between the storage tank and the one-way valve and in said flow path to maintain said pressure level in said storage tank in the event internal pressure in said storage tank rises independently of the gas under pressure supplied thereto and a microbiological filter connected in said flow path downstream of said pressure-maintaining valve and between it and said storage tank.

2. In combination, a storage tank for storing spoilable contents therein in a gaseous atmosphere; a system having means defining a single flow path externally of the storage tank for supplying and maintaining an aseptic gaseous atmosphere in said storage tank comprising aseptic valve means in said single flow path for supplying an inert aseptic gas into said storage tank, a microbiological filter upstream of said aseptic valve in the same single flow path for said gas as said aseptic valve, a conduit defining a part of said flow path for supplying said inert aseptic gas through said microbiological filter, a container externally of the tank for containing said inert aseptic gas under pressure, adjustable pressure-reducing valve means connected in said single flow path to said container and said conduit for receiving gas from said container and reducing the pressure to a pressure level to be maintained in said storage tank, a one-way valve in said conduit and single flow path downstream of the pressure-reducing relative to said container for allowing flow of said gas in a direction to said storage tank only, and a single pressure-maintaining valve connected to said single flow path between the storage tank and the one-way valve to maintain said pressure level in said storage tank in the event pressure in said tank exceeds said pressure level in dependence upon pressure rises arising internally of said storage tank.

* * * * *